April 19, 1960     R. W. TRIPP     2,933,244
TOOL RADIUS CORRECTION COMPUTER UTILIZING A RESOLVER
Original Filed Jan. 27, 1956     7 Sheets-Sheet 1

ROBERT W. TRIPP,
INVENTOR.

BY *W. E. Beatty*

ATTORNEY.

April 19, 1960 R. W. TRIPP 2,933,244
TOOL RADIUS CORRECTION COMPUTER UTILIZING A RESOLVER
Original Filed Jan. 27, 1956 7 Sheets-Sheet 2 fig. 3.

ROBERT W. TRIPP,
INVENTOR.

BY

ATTORNEY.

Fig.6.

April 19, 1960 R. W. TRIPP 2,933,244
TOOL RADIUS CORRECTION COMPUTER UTILIZING A RESOLVER
Original Filed Jan. 27, 1956 7 Sheets-Sheet 6

ROBERT W. TRIPP,
INVENTOR.

BY *W E Beatty*

ATTORNEY.

April 19, 1960  R. W. TRIPP  2,933,244
TOOL RADIUS CORRECTION COMPUTER UTILIZING A RESOLVER
Original Filed Jan. 27, 1956  7 Sheets-Sheet 7

ROBERT W. TRIPP,
INVENTOR.

BY
ATTORNEY.

United States Patent Office 2,933,244
Patented Apr. 19, 1960

2,933,244

TOOL RADIUS CORRECTION COMPUTER UTILIZING A RESOLVER

Robert W. Tripp, Bronxville, N.Y., assignor to Inductosyn Corporation, Carson City, Nev., a corporation of Nevada Original application January 27, 1956, Serial No. 561,769. Divided and this application January 14, 1957, Serial No. 633,900

7 Claims. (Cl. 235—61)

This invention relates to a computer useful for the control of machine tools in which a rotating cutter of finite radius and a workpiece are moved relatively to each other according to a program of information supplied to the traversing drives of the workpiece carriage or cutting head in the machine tool in order to generate on the workpiece a surface or profile of specified shape. More particularly, the invention relates to a tool radius correction computer utilizing a Scotch yoke device or component solver acting as a resolver for resolving a shaft rotation or angular position into co-function electrical values.

Machine tools having a data input may be referred to as programmed machines, the program to which the machine tool responds being the locus of the center or axis of the cutter with respect to the uncut workpiece or with respect to a frame of reference such as a machine tool carriage on which the workpiece is supported. This information may conveniently be stored in any suitable medium from which it is sensed by reading apparatus to advance the cutter with respect to the work in order to generate the desired surface. The locus of cutter centers must be established so that the edge of the cutter is at all times tangent to the required finished surface. Any change in the radius of the cutter requires revision of the program of cutter center locus. In the case of automatically programmed machines, the program must be recalculated and recorded, each such calculation of a locus of cutter centers required to generate a given surface with a cutter of given radius involving digital computation which may be very laborious.

According to the present invention, instead, the basic, i.e., the recorded program is in terms of the contour of the desired part to the exclusion of a correction for the tool radius. This basic program is then converted by an analog computer provided by this invention, into a program of cutter center locations for the machine tool, the cutter radius being inserted separately, either manually or automatically into the computer. The computer thus derives from the program of the desired surface the corrections to that program necessary to provide the machine tool with a program of cutter center locations for it to follow.

The invention greatly reduces the amount of digital computation which must be performed in the initial programming of the part to be cut, despite the necessity thereby involved, of programming not only the desired finished surface but also the angle between the tangent to the workpiece at its successive points of contact with the cutter and one of the coordinate axes in terms of which the desired finished surface is programmed.

Another important advantage of the invention is the facility with which the cutter size may be changed, without recomputation of the basic program. A change from positive to negative in the cutter radius input to the computer results in transfer of the cutter motion from one to the opposite sides of the profile specified by the basic program information. In this way, matching male and female parts can be cut from the same program. By using in the computer a cutter radius setting slightly different from that of the cutter actually employed, the machine tool can be caused to cut the workpiece a corresponding amount larger or smaller than is called for by the program of the workpiece itself. Thus mating parts can be cut with a predetermined space between them, as is useful in the production of stamping dies. Roughing cuts can also be made by this method, followed by a finishing cut made with a different sized cutter or with the same cutter upon proper adjustment of the cutter radius setting in the computer of this invention.

The invention will now be described by reference to the accompanying drawings in which.

Figure 1:
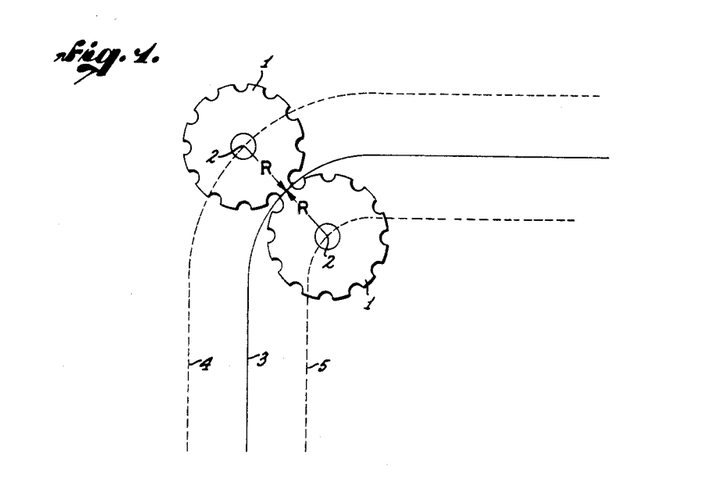
Figs. 1 and 2 are diagrams illustrating the relation between a cutter and a workpiece on which a profile is to be cut.
Figure 2:
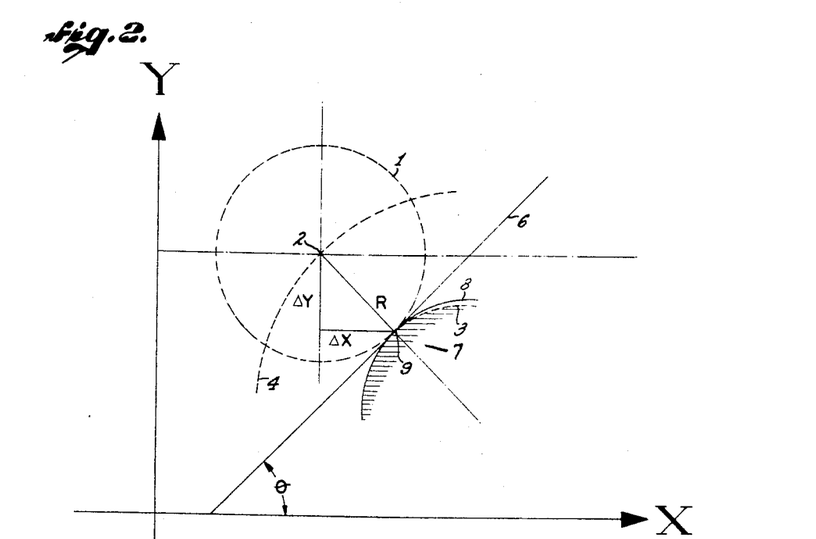

Figs. 1 and 2 illustrate the relation between a circular or cylindrical cutter 1 and a workpiece on which a profile is to be cut. In Fig. 1, 3 represents the trace in the plane of that figure of the profile or contour to be imparted to a workpiece. This may be either an outside or an inside contour. In the former, 4 represents the paths to be followed by the center of the cutter 1 having a radius R with axis 2 perpendicular to the plane of the figure in cutting the contour shown. In the case of an inside contour, 5 represents the path of the cutter center or axis.

The relation between the profile 3 and the cutter center path 4 or 5 is shown in more detail in Fig. 2, where X and Y are coordinate axes in terms of which may be specified the desired profile 3 and the relative motion of the cutter and machine tool (i.e., the motion of the cutter center 2 with respect to the workpiece 7 to be cut). The unfinished portion of profile 3 is shown in dashed lines in Fig. 2, the adjacent unfinished edge of the workpiece being shown at 8. Directions of increasing positive value for these coordinates are indicated by the arrows on the X and Y axes in the figure. 6 is the common tangent to the cutter 1 and to the workpiece at the point 9 of instantaneous cut. $\theta$ is the angle made by this tangent with the X axis. $\Delta x$ and $\Delta y$ are the corrections which must be added to the $x$ and $y$ coordinates respectively of the point 9 on the profile 3 to obtain the coordinates of the cutter center 2. The cutter radius R is normal to tangent 6 and is therefore inclined to the X axis by $\theta + 90°$. Hence:

$$\Delta x = R \cos(\theta + 90°) = -R \sin\theta$$
$$\Delta y = R \sin(\theta + 90°) = R \cos\theta$$

$\theta$ is here measured counterclockwise from the X axis to the portion of the tangent 6 extending from the X axis in the direction of cut, i.e., of advance of the cutter with respect to the workpiece. The radius R is positive when the workpiece is to the right of the tangent and negative when the workpiece is to the left of the tangent as viewed in the direction of cut. Other sign conventions can of course be adopted provided they are self-consistent.

From the expressions for the corrections to the profile coordinates $x$ and $y$ necessary to obtain the coordinates of the cutter center, it is apparent that the cutter radius correction can be made if the angle $\theta$ is programmed in addition to the profile coordinates $x$ and $y$. The values of $\theta$ belonging to the successive combinations of $x$ and $y$ are specified by the corresponding $x$, $y$ values and can be programmed along with the $x$, $y$ values themselves. In the description of the invention now to be given, it will be assumed that this has been done, i.e., that there is available a recorded program of the values $x$, $y$ and $\theta$ which are to characterize the workpiece. This program is disclosed in general by the rectangle $D^1$ in Fig. 4 and will be described in further detail in connection with Fig. 6, and Fig. 7.

Figure 3:
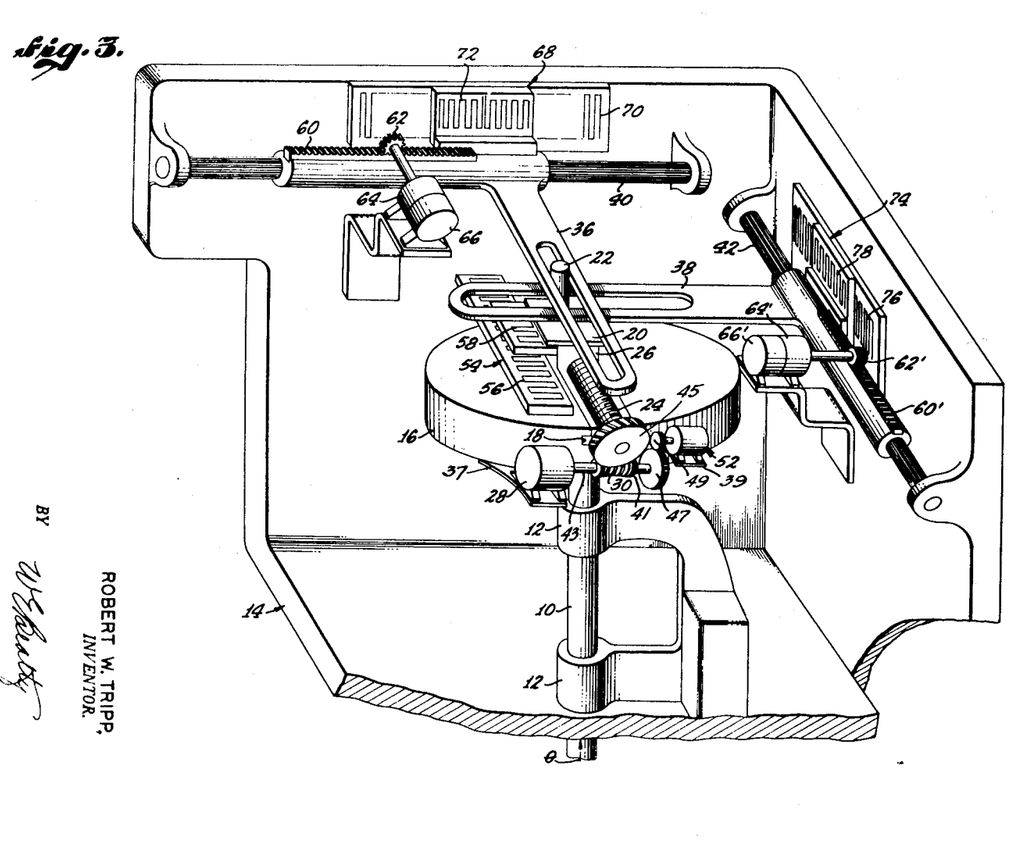
Fig. 3 is a perspective view of one embodiment of the computer of this invention, utilizing a Scotch yoke device or component solver as a resolver.
Figure 4:
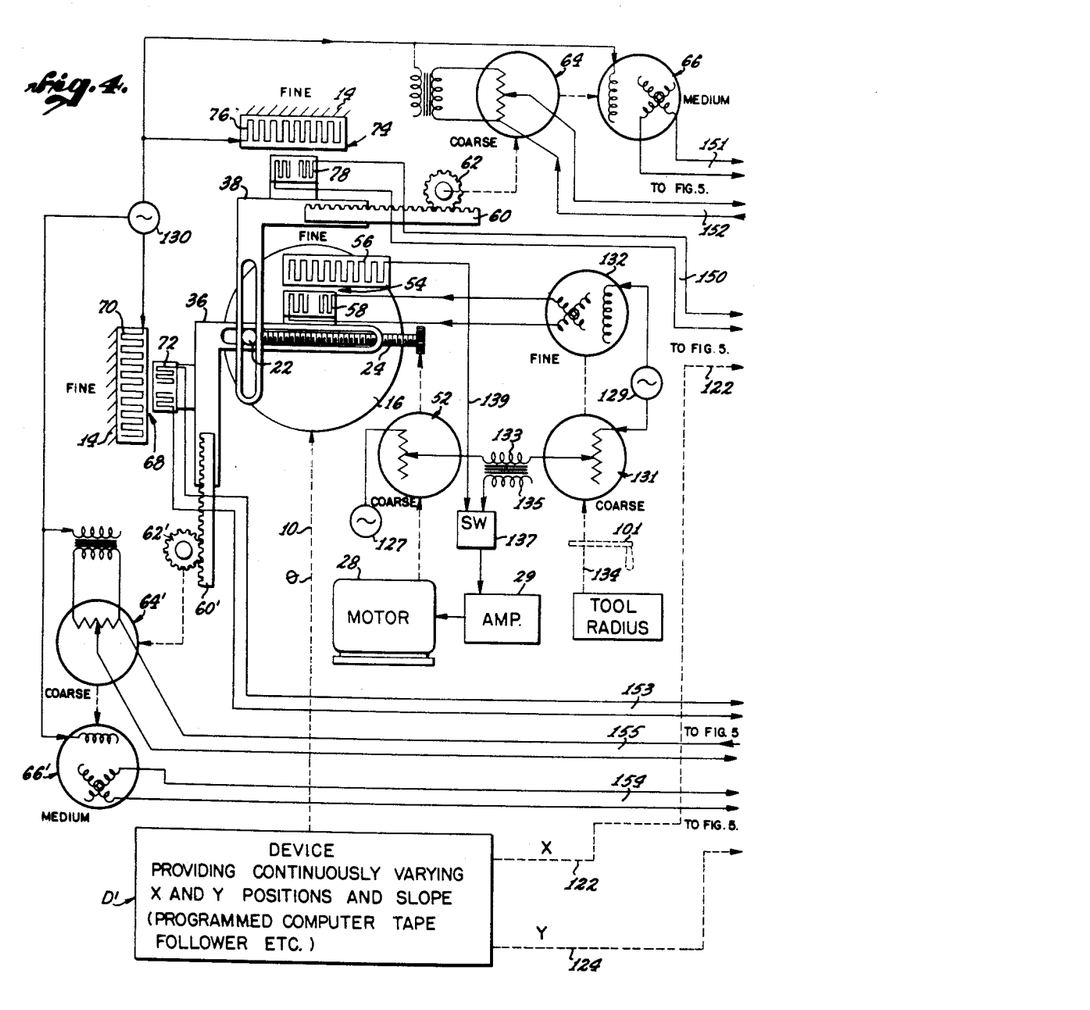

Referring now to Fig. 3, there is shown a preferred form of a computer for development of the corrections $\Delta x$ and $\Delta y$ from the programmed values of $\theta$ and from the radius value R of the cutter to be used, supplying $\Delta x$ and $\Delta y$ for addition to the programmed $x$, $y$ values, as illustrated in Fig. 4.

In Fig. 3, shaft 10 is rotatably mounted in bearings 12 of a frame 14. Shaft 10 is a crank shaft coupled to yokes 36 and 38 by a crank which includes table 16 and the radially adjustable crank pin 22. The shaft 10 carries a table 16 in which is cut a set of guide ways 18. The ways 18 guide a carriage 20 which supports a pin 22 whose path of motion is established by the carriage to be perpendicular to the axis of rotation of shaft 10, i.e., to intersect that axis perpendicularly. A screw 24 journaled in the table 16 engages a nut 26 on the carriage to drive the latter and with it the pin 22. The screw and hence the carriage and pin are driven by means of a motor 28 through gearing 30, and the shaft 10 and table 16 are driven in angular motion as an output from differential gear DG1, Fig. 1, which has two inputs, namely one input on shaft S1, which is the output of the ball-disk-cylinder integrator 201, the other input being from shaft S2 of servo motor 202 which supplies an input in proportion to the slope angle from the slope angle input D3, as described and claimed in co-pending application Ser. No. 540,748, filed October 17, 1955 by Robert W. Tripp for Automatic Shaft Control, now Patent 2,839,711, June 17, 1958. As described in said application, the input blocks D2 to D5 represent input data, for example, in the form of a perforated tape having feeler brushes for applying the 24 v. indicated to stepping switches or the like as indicated by the presence or absence of holes, such holes being arranged or available in digital groups. In the case of input D3, five groups are indicated, the digital values or steps in each decimal group for example being of the values indicated in the five groups shown at D3, whereby any desired angular position of shaft S2 and shaft 10 may be obtained in steps of .01°.

The construction and operation of this differential gear DG1 is well known. See for example page 12 of the following publication, "Designing Computing Mechanisms" by Macon Fry, Reprinted from Machine Design, August 1945 through February 1946. Thus, if the contour to be cut on the workpiece involved only slope, input S1 is zero, whereas, for more complex contours, the output 10 or $\theta$ equals the sum of S1 and S2, which means that slope is controlled by curvature from the digital input data of curvature D4, and in connection with Fig. 6, it will be shown how curvature, in turn, is controlled by the next higher order component, namely, rate of change of curvature from the digital input data thereof D5.

Figure 6:
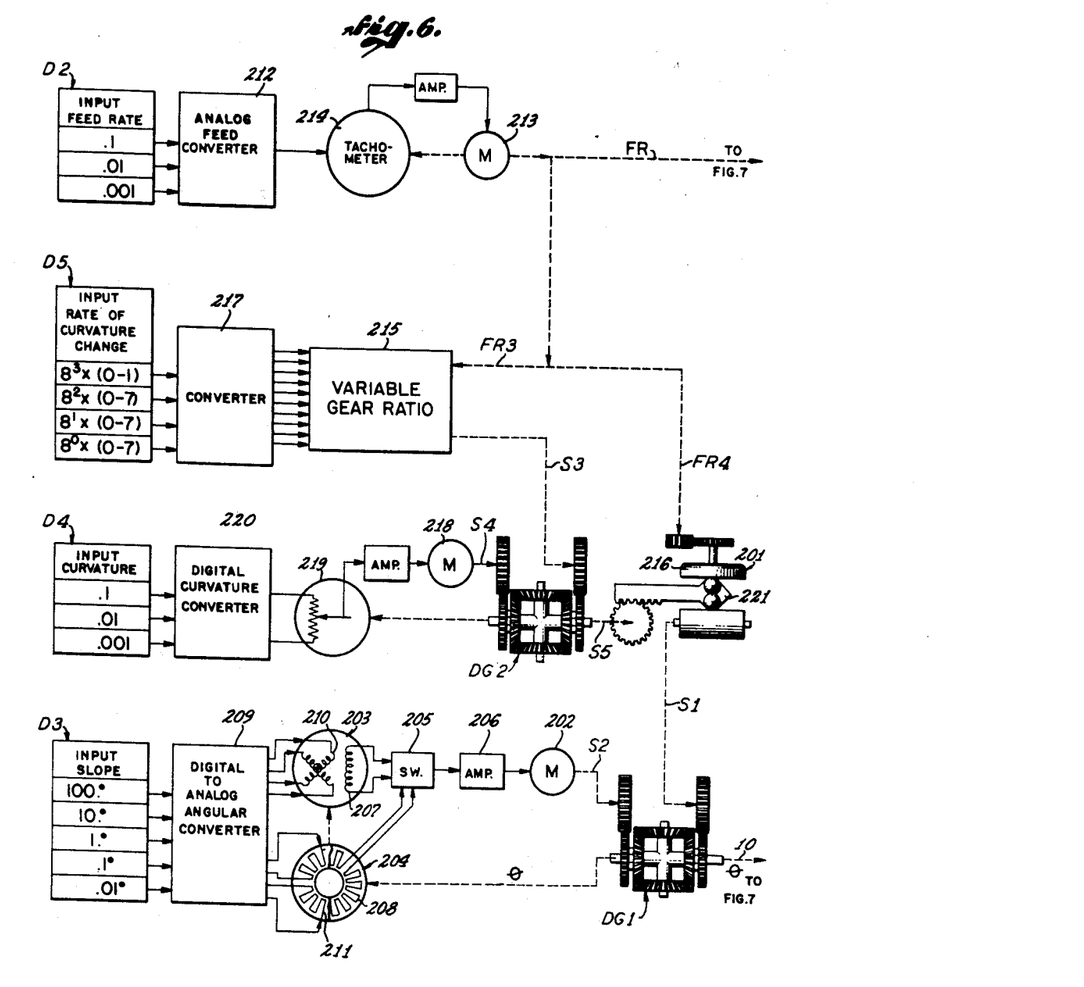
Figs. 6 and 7 illustrate an amplification of the block marked "Device" in Fig. 4, and illustrate various data inputs and associated converter or computer apparatus for operating the $\theta$, X and Y shafts of Fig. 4, Fig. 7 fitting to the right of Fig. 6.
Figure 7:
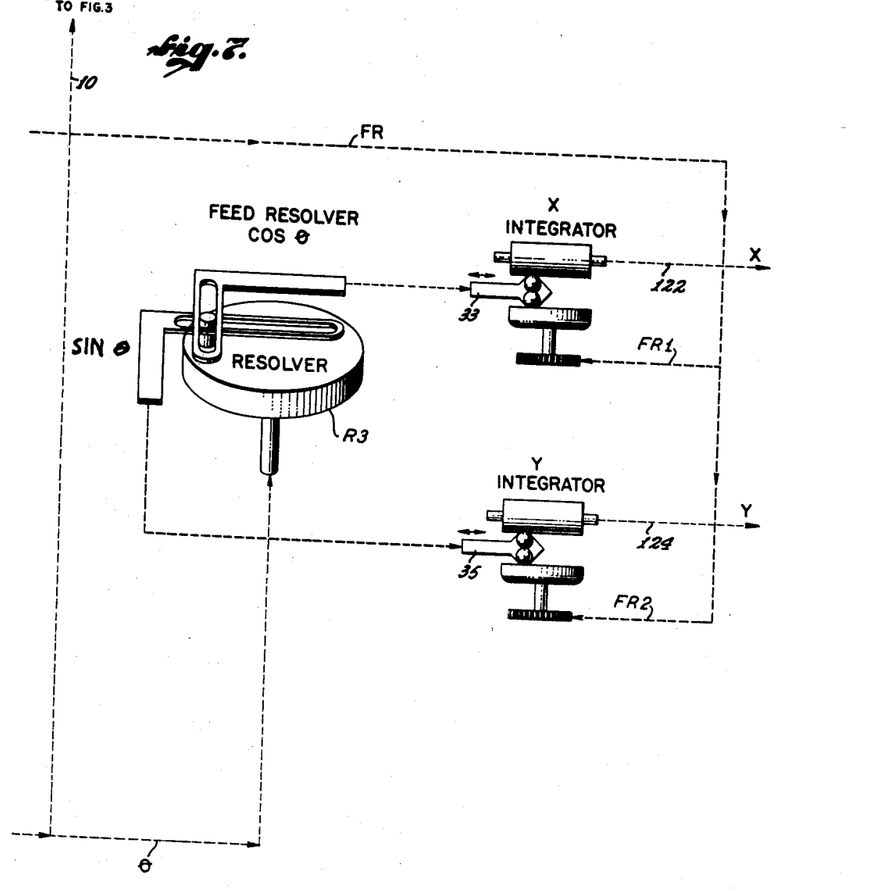

In the case of the shaft 10, which drives the feed resolver R3 in Fig. 7 as well as the table 16 in Figs. 3 and 4, the servomechanism including motor 202 (see Fig. 6), coarse data resolver 203 and fine data rotary Inductosyn (trademark) 204 mounted on or coupled to shaft 10, as well as switch 205 (like switch 137) and the amplifier 206 serve to compare the actual position of shaft 10 with its desired position as called for by the input data D3, this comparison being made first in coarse terms by resolver 203, and then in fine terms by Inductosyn 204, servoing the shaft 10 via motor 202 to correspondence between its actual and desired positions.

Referring to Fig. 6, the coarse data element 203 has a rotary coil 207 carried by shaft 10 and the fine data element 204 has a continuous winding or coil 208 also carried by shaft 10, these coils 207 and 208 assuming a rotary position determined by the sum of the angles determined by the input information D3, in consequence of the digital-to-analog angular converter 209 converting such information into co-function sin and cos values for supply to the quadrature windings 210 of element 203 and to the quadrature windings 211 of element 204 as described and claimed in co-pending application S.N. 540,748 filed October 17, 1955 by Robert W. Tripp for Automatic Shaft Control, now Patent No. 2,839,711.

Said application S.N. 540,748, now Patent No. 2,839,711, also contains reference to various publications describing servo techniques which may be employed.

The rotary Inductosyn 204 is a position measuring transformer similar in action to the conventional resolver 203 but having a larger number of poles, the continuous winding 208 being mounted on an insulating disk in inductive relation and close space relation to the quadrature windings 211 on another insulating disk, these windings being arranged for high accuracy as described and claimed in application S.N. 509,168 filed May 18, 1955 by Robert W. Tripp and J. L. Winget for Position Measuring Transformer, Patent No. 2,799,385 issued July 16, 1957 which also describes and claims the linear form of Inductosyn as indicated at 54, 68 and 74 in Fig. 4 and at 100 and 102 in Fig. 5, the rotary form also being covered by S.N. 536,464 filed September 26, 1955 by R. W. Tripp for Miscrosolver. All of said co-pending applications referred to herein are assigned to the assignee of the present application.

While the angular input information D3 as indicated in Fig. 6 and as described and claimed in the above mentioned application S.N. 540,748, now Patent No. 2,839,711, is given as an example of input data which may be employed to position or continuously rotate shaft 10, other types of data input or operating means therefor may be employed. For example, the shaft 10 may be positioned also in accordance with a program D4 of the curvature and a program D5 of the rate of change of curvature of the tool path, as described and claimed in co-pending application case 3, S.N. 557,035 filed January 3, 1956 by R. W. Tripp for Automatic Machine Control Method and System, now Patent 2,875,390, February 24, 1959. Said application case 3 last mentioned also discloses and claims the feed rate input D2 of Fig. 6 herein, providing for a programmed speed of the feed rate shaft FR, and supplying a decimal digital input of feed rate data to the analog feed converter 212 indicated. A servo motor 213 drives the feed rate shaft FR at a rate such that the difference between the voltage generated by the feed converter 212 and a tachometer 214 is essentially zero. Said application case 3 also discloses and claims the above features as well as the feature of the feed resolver R3 of Fig. 7 being operated by the shaft 10 to resolve the angular instruction contained in shaft 10 into linear displacements mutually at right angles to each other in accordance with the co-function values sin $\theta$ and cos $\theta$ as shown, which operate the ball slides 33 and 35 respectively of the disk-ball-cylinder X and Y integrators which integrate their inputs 33 and 35 with respect to the feed rate FR which is an input to the disks of these integrators as shown at FR1 and FR2 in Fig. 7.

To avoid repeated reference to case 3 it will be understood that Figs. 6 and 7 herein are a schematic showing of Figs. 1 to 17 of case 3 to which reference may be made for further details, and that all features of invention in Figs. 6 and 7 herein are disclosed and claimed in case 3.

The feed rate FR is also an input FR3 to the variable or binary gear ratio 215 and an input FR4 to the disk 216 of integrator 201.

The decimal digital input D5 in octal form is converted to binary form by converter 217 and controls binary gear ratio 215 to provide an output speed of shaft S3 as called for by the input data D5. The shaft S3 is an input to the differential gear DG2 which is similar to DG1. The shaft S4 is another input to the differential gear DG2. Shaft S4 is driven by servo motor 218 until the potentiometer 219 sets up a voltage to balance the voltage from converter 220 as selected by the decimal digital curvature input D4. The ball slide 221 is thus driven by shaft S5 to a position depending upon the inputs D4 and D5, to thereby drive shaft S1 to a position or at a speed depending upon the integration of the inputs D4 and D5 with the feed rate FR.

Figure 5:
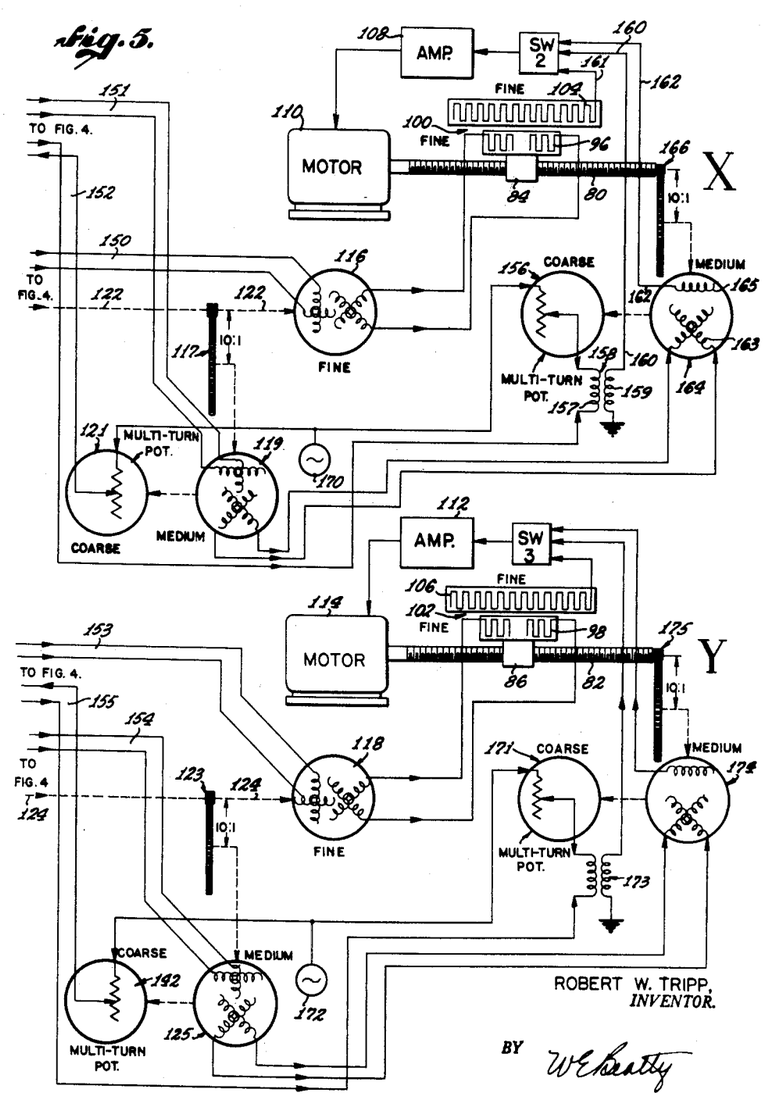
Fig. 5 fits at the right hand side of Fig. 4, these two figures illustrating diagrammatically a computer system employing the computer of Fig. 3, with a source of programmed information on a workpiece to be cut and computing the tool radius correction and controlling the machine drives in accordance with the input information thus corrected.
Figure 8:
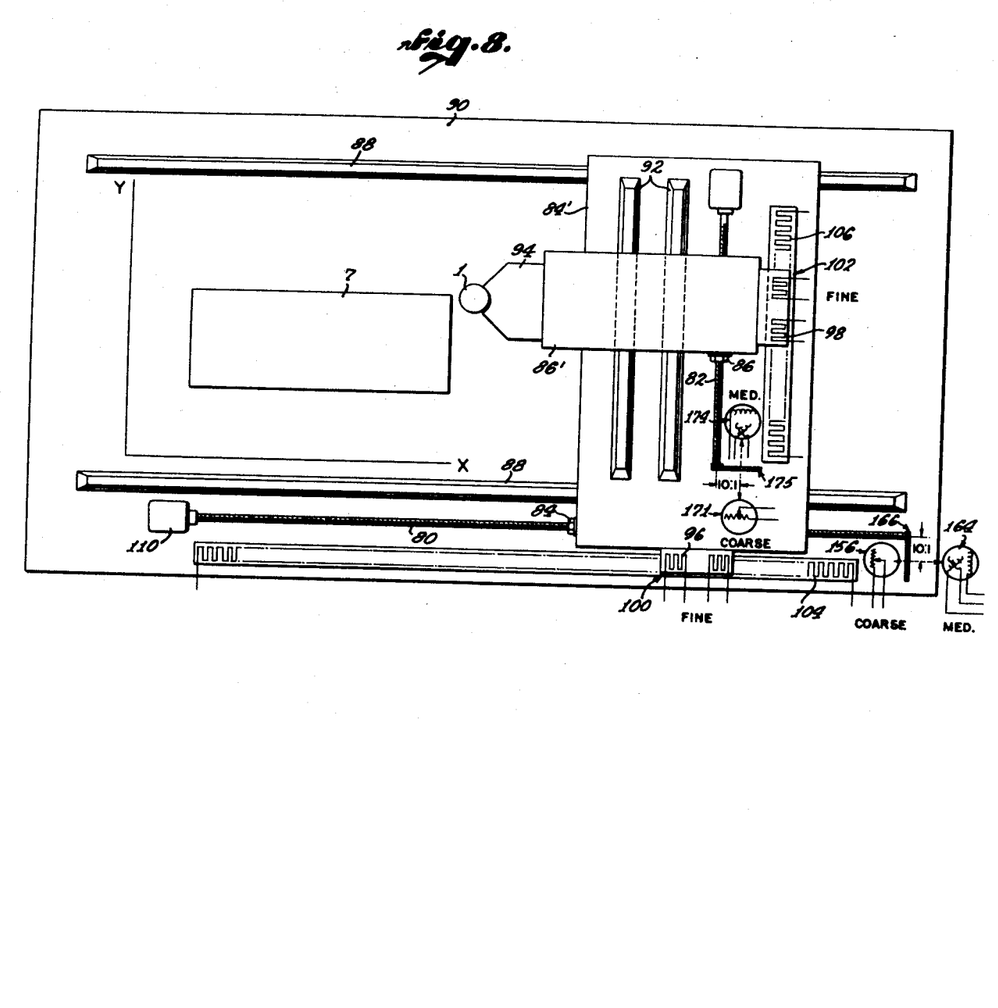
Fig. 8 is a plan view of a machine tool having drives along X and Y axes for advancing a workpiece and a cutter or tool relative to each other.

To summarize the disclosure of Fig. 6, this schematically represents a program of data for operating the feed rate shaft FR and the shaft 10 to relatively drive the driven elements 84 and 86 in Figs. 5 and 8 so that the tool 1 in Fig. 8 will be driven to a desired position or follow a desired path.

By means presently to be described, the motor 28 is controlled to drive pin 22, and shaft 10 is driven by one or both of the inputs S1 and S2 to differential gear DG1, see Fig. 6, to positions such that the distance between the axes of pin 22 and of shaft 10 accurately represents the cutter radius R and such that the angular position of pin 22 about the axis of shaft 10 accurately represents, with reference to a prime direction, the angle $\theta$. The value of R ordinarily changes only when the cutter is changed on the machine tool so that it is within the scope of the invention to provide for the setting of R by manual displacement of the pin 22 with respect to the axis of shaft 10. The embodiment of the invention illustrated includes means whereby the value of R as well as the value of $\theta$ in the computer can be automatically and continuously varied. Such manual means for varying the value of R may take the form of a crank or handle 101 in Fig. 4 for operating the shaft 134 which operates the coarse potentiometer 131 and the fine resolver 132 which operate as transmitters for their respective coarse potentiometer receiver 52 and Inductosyn fine data element 54. Servomotor 28 drives the coarse element 52 and the screw 24, and screw 24 drives the Inductosyn slider 58 until the error signals from the coarse and fine elements 52 and 54 reach a null, as in usual servo practice. As shown in Fig. 3, servo motor 28 and coarse data element 52 are carried by the table 16, being suitably mounted on supports 37 and 39 respectively, fixed to table 16. The gearing 30 includes a worm gear 41 on the shaft 43 of motor 28, and worm 41 drives worm wheel 45. The motor shaft 43 also drives a gear 47 which drives a pinion 49 fixed to the swinger of the coarse data element 52.

The fine position data element coupled to the carriage 20 for indication of the position of pin 22 is a precision linear positioning measuring transformer, generally indicated at 54. This transformer includes a scale member 56 fastened to the table 16 and a slider member 58 fastened to carriage 20. The member 56 includes a continuous multipolar windings in which uniformly spaced conductors are connected in series and positioned to extend transversely of the relative direction of motion of the two transformer members as established by the lead screw. The transformer member 58 includes two basically similar multipolar windings which are, however, positioned to each other in space quadrature of the pole cycle comprising two adjacent conductors on the member 56. A reference source of voltage is shown at 127 for coarse element 52 and at 129 for elements 131 and 132. The swingers of elements 52 and 131 are connected in opposition through the primary winding 133 of a transformer having a secondary winding 135 which supplies the coarse error signal to the switch 137 which also receives the fine error signal in line 139 from the element 54. The error currents are controlled by switch 137 as the two transformer members as esablished by the lead to motor 28.

Also, shaft 134 which adjusts the radial position of pin 22 may be operated automatically and continuously by an R-data input indicated at 141, Fig. 4, which may for example include means for converting input data into a shaft rotation as shown and described in connection with the digital-to-analog converter 209 of Fig. 6.

From the values of R and $\theta$ put into the computer of Figs. 3 and 4, the corrections $\Delta x$ and $\Delta y$ are developed, with a high degree of accuracy, and circuits connecting Figs. 4 and 5 are provided whereby these corrections are then transmitted to appropriate locations at Fig. 5 for combination with the programmed $x$, $y$ values from program device D1, Fig. 4 or from the inputs D2 to D5 Fig. 6, as manifested in the rotations of shafts 122 and 124, so that the machine tool 1 itself, Fig. 8, may be driven to position the cutter center with respect to the workpiece 7 according to the values $x+\Delta x$, $y+\Delta y$.

For development of the corrections $\Delta x$ and $\Delta y$, the pin 22 engages two yokes 36 and 38, respectively constrained by bearing rods 40 and 42 in frame 14 to move perpendicularly to the axis of shaft 10 and to each other. If when the angle $\theta$ in the program of the part to be cut is zero, the pin 22 and the axis of shaft 10 are spread apart the distance R and aligned perpendicularly to the bearing rod 42 and if table 16 thereafter rotates through the angle $\theta$, the yokes 36 and 38 will execute simple harmonic motion of amplitude R, that of yoke 36 being R cos $\theta$ and that of yoke 38 being R sin $\theta$. Either direction of rotation of the table may be made to correspond to increasing values of the angle $\theta$.

Because the values $\Delta x$, $\Delta y$ must be determined to a high degree of accuracy, which may be of the order of a thousandth or a ten thousandths of an inch, the $\theta$ values for the angular position of the table 16 and the R values for the radial position of pin 22 must be supplied with accuracies of the same order of magnitude, and means are provided to cause those elements to assume positions in accordance with the data thus supplied. To this end, the embodiment of Figs. 3, 4 and 6 includes both coarse and fine data indicating elements for indication of the $\theta$ and R values actually assumed by the computer, i.e., the angular position of table 16 and the radial position of carriage 20 and pin 22. Referring to Fig. 4, the R value is indicated by the coarse transmitter 131, its coarse receiver 52 and by the fine transmitter 132 and its fine receiver 54. Referring to Fig. 6, the value of angle $\theta$ is indicated by the coarse data element 203 and by the fine data element 204.

The table 16 and its carriage 20 are thus caused to assume positions in accordance with the values $\theta$ and R supplied to the computer of Fig. 3 from the basic program sources where digital values of R and $\theta$ are converted into analog values by means of the servomechanisms described.

There have been thus far described the elements of the computer of Figs. 3 and 4 by means of which the yokes 36 and 38 are caused to assume positions accurately corresponding to R cos $\theta$ and R sin $\theta$. The positions R sin $\theta$ and R cos $\theta$ so established are then transformed according to the invention into electrical signals for addition by suitable apparatus, to be described in exemplary form by reference to Fig. 4, to the $x$ and $y$ program values for the profile to be imparted to the workpiece by the machine tool being controlled. This transformation is effected by means of position data elements coupled between the yokes 36 and 38 and the frame 14.

Both coarse and fine elements are required for generation of electrical signals representative of R sin $\theta$ and R cos $\theta$ in view of the accuracy demanded in machine tool operation, and it may be advantageous to break down the electrical data of R sin $\theta$ and R cos $\theta$ into coarse, medium and fine stages. Fig. 3 diagrammatically indicates such an embodiment of the computer of the invention with 3 such stages for each of the $x$ and $y$ positions. For generation of coarse and medium position data each of the yokes 36 and 38 has associated therewith gear mechanism diagrammatically indicated as including a rack 60 and pinion 62 for position $y$ and rack 60' and pinion 62' for position $x$ for generation of angular motion. This angular motion is coupled in each case to a potentiometer 64 for $y$ and 64' for $x$, the tap of which is shifted from one end to the other of the potentiometer winding not more than once for the full travel of the yoke to which it is coupled. In this way unambiguous indications of the coarse increment of R sin $\theta$, R cos $\theta$ can be generated for algebraic addition to similarly coarse increments of the profile program $x$, $y$, and the sums $x - R$ sin $\theta$ and $y + R$ cos $\theta$ to this coarse degree of accuracy can be employed in servomechanism of known type to drive the workpiece and cutter head of the machine tool to approximately correct relative position.

Mechanically coupled to the gearing system 60, 62, and 60', 62' of each of the yokes there may also be provided a position data transmitter 66 and 66' of medium fineness, i.e., which may be cyclical in its indication of position over a substantial number of cycles comprised within the range of values zero to maximum R. The data transmission elements 66, 66' may advantageously be provided in the form of synchros or resolvers, and the medium fine ingredient of R sin $\theta$ and R cos $\theta$ developed thereby may be added, by differential resolvers for example, to similarly medium coarse data on $x$ and $y$ to servo the machine tool head position to a second degree of accuracy with respect to the workpiece after the coarse positioning has been achieved.

For fine positioning of the cutter center with respect to the workpiece in accordance with the values $x - R$ sin $\theta$ and $y + R$ cos $\theta$ the yokes 36 and 38 have associated therewith precision measurement transformers generally indicated at 68 and 74 which may be identical to each other, particularly in the dimension of their pole cycles, and to the transformer 54 previously described. The single or continuous winding members 70 and 76 of transformers 68 and 74 are affixed to the frame 14 while the quadrature winding members 72 and 78 thereof are affixed to the yokes 36 and 38, respectively. The mechanical arrangement here as well as in the case of transformer 54 is such that the windings of the two members of this transformer, which conveniently lie on plane faces of insulating supports, are supported parallel to each other and at a close separation.

By a process which is the converse of that employed in transformer 54, from excitation of the single continuous windings of members 70 and 75 with an A.C. voltage from source 130, a suitable frequency for which may be of the order of 10 kilocycles, there will be developed in the quadrature windings of members 72 and 78 in-phase voltages whose amplitudes are related as the sine and cosine of the space phase between the two members of each transformer within the pole cycle thereof, zero reference for this phase being that in which the voltage in one quadrature winding of each member is zero and the voltage in the other quadrature winding of that member is at a maximum. This is equivalent to saying that the voltages in the quadrature windings of members 72 and 74 for example are proportional to the sine and cosine of the angle through which a shaft would turn if geared to the linear motion of yokes 36 and 38 to make one revolution for travel of these yokes through the pole cycle of transformer members 70 and 76.

For each of transformers 68 and 74 therefore, the two secondary voltages so developed constitute electrical signals representative of fine increments in the R cos $\theta$ and R sin $\theta$ positions of the yokes 36 and 38, and these signals are employed for fine corrections of the position of the center of the rotating cutting tool with respect to the workpiece, as will now be described with reference to Figs. 4 and 5.

Fig. 4 illustrates, in diagrammatic form, the computer of Fig. 3, the drives of a machine tool which the computer is to assist in controlling, a program source of fine increments in $x$, $y$, $\theta$ values in terms of shaft rotations, and a source of fine increments in cutter radius settings R, also in terms of a shaft rotation. Fig. 4 also shows means to convert these shaft rotations into electrical signals, the R and $\theta$ signals being for input to the computer of Fig. 3 and the $x$ and $y$ signals being for addition to the electrical output signals from the computer of Fig. 3 which are representative of fine increments in R sin $\theta$ and R cos $\theta$ so that the fine position control of the machine tool drives may be governed by these sum signals.

In Fig. 5 there are shown lead screws 80 and 82 engaging nuts 84 and 86. These lead screws with their nuts constitute a combination of drives for advancing a rotating cutter 1 with respect to workpiece 7, as diagrammatically shown in Fig. 8.

In Fig. 8 the bed 90 of a machine tool has removably fixed thereto a workpiece 7 for engagement with a cutter 1. Ways 88 on the bed support a carriage 84', coupled at nut 84 to lead screw 80 which is journaled in the bed. Carriage 84' itself is provided with ways 92 perpendicular to ways 88, and a carriage 86' riding on ways 92 is coupled by nut 86 to lead screw 82, journaled in carriage 84'. The cutter 1 is spindled in a head 94 attached to carriage 86', with its axis perpendicular to the plane of motion of carriage 86' defined by ways 88 and 92 parallel to the bed 90. X and Y coordinate axes are shown on the bed parallel to the ways 88 and 92.

In practice, the construction of the machine tool and its arrangement for advancing the cutter with respect to the workpiece may be very different from that shown in Fig. 8, it being perhaps more common for the spindle which supports the cutter to be fixed and the workpiece to be advanced with respect to it. The diagrammatic showing of Fig. 8 nonetheless illustrates how orthogonal drives may be provided for advancing a workpiece with respect to a rotating cutter to form on the workpiece a contour which may be defined in advance as a function of rectangular coordinates whose axes are parallel respectively to the perpendicular directions of relative cutter-workpiece motion provided by such drives.

To return to Fig. 5, there are coupled to nuts 84 and 86 the quadrature winding members 96 and 98 of fine data linear position transformers generally indicated at 100 and 102 similar to the transformers 54, 68 and 74 of Figs. 3 and 4. The continuous winding members 104 and 106 of transformers 100 and 102 are fastened in the frames of reference with which lead screws 80 and 82 are journaled respectively and with respect to which nuts 84 and 86 are to move, as further illustrated in Fig. 8. The single winding members 101 and 106 are connected into servoloops including, for transformer 100 and its associated lead screw 80, an amplifier 108 and a motor 110. For transformer 102, the amplifier is identified at 112 and the motor coupled to lead screw 82 is identified at 114. While each of the continuous windings and each of the quadrature windings of the transformers 54, 68, 74, 100 and 102 is a two-terminal winding, there is shown in Figs. 4 and 5 for clarity only one lead or cable connecting to each of these transformer windings.

Referring to Fig. 5, if the quadrature winding members 96 and 98 are energized respectively with the pairs of voltages generated in members 78 and 72, in Figs. 3 and 4, there will be induced in the members 104 and 106 error voltages which will, via the associated servoloops, drive the nuts 84 and 86 to positions of zero error voltage, i.e., the nuts will be driven in accordance with fine increments in R sin θ and R cos θ. In order to drive them instead according to the sum of fine increments in x−R sin θ and x+R cos θ, means are provided for effecting addition of fine increments in the x and y values to fine increments in the R sin θ and R cos θ output signals of the computer, the minus sign in the case of R sin θ being taken care of by an appropriate selection of leads at member 78. When x and y are available as mechanical rotations, such addition may be performed in differential resolvers 116 for the x coordinate and 118 for the y coordinate.

These resolvers 116 and 118, are transformers including relatively rotatable rotor and stator members having each a pair of windings in space quadrature. They are indicated diagrammatically in Fig. 5 by means of circles axially coupled to shafts 122 and 124, respectively represented by a dashed line. The shafts 122 and 124 are outputs of the X and Y integrators of Fig. 7. With each circle for resolvers 116 and 118 are shown two pairs of crossed windings. Each pair of windings represents two windings in space quadrature, one pair being on a stator member and the other on a rotor member, the shaft being coupled to the rotor member. The two windings of each pair are in space quadrature of the cycle of rotor-stator rotation over which the amplitude of the voltage induced from a winding of one pair into a winding of the other pair goes through a complete cycle from maximum amplitude in one time phase to maximum amplitude in the opposite time phase and back to maximum amplitude in the first time phase. This cycle usually amounts to 360° of rotor-stator rotation.

Either pair of quadrature windings may act as primaries and the other as secondaries. The variation with rotor-stator position in the amplitudes of the secondary voltages due to each primary voltage is sinusoidal, with a 90° difference in the phase of the variations between the two secondaries. Accordingly, the voltage of each primary, as induced into the two secondaries, is resolved into components which are to each other as the sine and cosine of the departure of the transformer members from a reference angular position in which one secondary voltage is zero and the other is at a maximum. Resolvers are therefore capable of taking the sines and cosines of the sum of two angles, one angle being introduced in terms of rotor-stator position and the other in terms of the ratio of primary voltage amplitudes. Highly accurate resolvers of this type are described in the copending application of Robert W. Tripp, Serial No. 536,464, filed September 26, 1955 entitled, "Microsolver" which is assigned to the assignee hereof.

For resolvers 116 and 118 the rotor angle inputs represent increments in the x and y values of the desired workpiece contour. A program unit D1 is coupled to resolvers 116 and 118 via shafts 122 and 124, the mechanical outputs of the program unit to these shafts being such that one rotation of those shafts represents in each case a change in x or y equal to the pole cycle of the transformers 100 and 102.

Shaft 122 is driven by the cylinder of the X integrator in Fig. 7, and is an input to the fine data resolver 116, in Fig. 5, which operates as a transmitter for the fine data element 100, as well as an input through the 10 to 1 gearing 117 to the medium resolver transmitter 119 and the coarse potentiometer transmitter 121. These transmitter elements 116, 119 and 121, pertain to positioning the X machine element 84, in accordance with the algebraic sum of the command instruction in shaft 122 and the tool radius correction instruction in the form of electrical signals in the lines 150, 151 and 152 from their respective fine, medium and coarse data transmitters 74, 66 and 64 in Fig. 4. In a similar way, the Y machine element 86 receives its instruction, in part, from the command instruction in shaft 124 which operates the fine data resolver 118 which functions as a differential synchro transmitter for the fine data element 102, the shaft 124 operating through the gearing 123 to operate the resolver 125 which functions as a differential synchro transmitter of medium data, and also operating the coarse potentiometer transmitter 142. These transmitter elements 118, 125 and 142 pertain to positioning the Y machine element 86 in accordance with the algebraic sum of the command instruction in shaft 124 and the tool radius correction instruction in the form of electrical signals in the lines 153, 154 and 155 from their respective fine, medium and coarse data transmitters 68, 66' and 64' in Fig. 4.

The coarse potentiometer 156 is a receiver for its transmitter 121 and is connected in opposition with its shaft instruction transmitter 121 and with its tool radius instruction transmitter 64 through the primary winding 157 of a transformer 158, a source of voltage 170 being provided for these elements. Transformer 158 has a secondary winding 159 which supplies the coarse error signal to switch SW2 over line 160. The fine error signal from stationary winding 104 is lead to switch SW2 over line 161. The four winding resolver 119 provides an input to the quadrature windings 163 of the medium resolver receiver 164 which has a single winding 165 which transmits the medium error signal line 162 to switch SW2. The coarse receiver 156 and the medium resolver 164 are driven from shaft 80 through the 10 to 1 gearing 166, like gearing 117. As in usual servo practice, the servomotor 110 drives the driven element 84, in coarse, medium and fine increments as called for by the instruction in the transmitters 121 and 64, 119 and 116, this instruction being the X component of θ and R.

In a similar way, the coarse potentiometer receiver 171 is provided for the coarse potentiometer transmitter 142 and the coarse potentiometer 64', a source 172 being provided, the coarse error signal being fed through transformer 173 to switch SW3, as described above. Also, the medium resolver 174 is a receiver for its transmitter 125, the coarse and medium elements 171 and 174 being driven from shaft 82 by the 10 to 1 gearing 175, and the coarse and medium error signals therefrom being supplied to switch SW3 to control servomotor 114 and to drive the driven element 86 to a position called for by the instruction in the transmitters 142 and 64', 125 and 118, this instruction being the Y component of θ and R.

If the pole cycle of the linear position measuring transformers 54, 68 and 74 is the same, as is convenient, the calibration of the R input data unit 141 should be such that one revolution of shaft 134 represents a change in R equal to the pole cycle of the transformers 100 and 102. Negative values of R, for the cutting of inside as contrasted with outside profiles, may be realized by excursions of pin 22 in the opposite direction from the center of table 16.

Physically, the resolver-type fine data transmitting elements 116, 118, and their associated coarse data elements 121 and 142 and medium elements 119 and 125, may conveniently be located at the program unit D1 where the shaft rotations therefor are directly available.

Various modifications may be made in the apparatus of the invention within the scope of the appended claims. The input data to transformer 54 may be obtained otherwise than from resolver 32 as shown, particularly if the information in R and θ are initially available otherwise than as shaft rotations. Switching networks may be provided to develop voltages related as sine and cosine functions of cyclical increments in R and θ, and the voltages so developed may be applied directly to transformer 54. Likewise, if $x$ and $y$ are available from the program units D2 to D5 in the form of voltages, the additions performed in the embodiment of Fig. 5 at resolvers 116 and 118 may be effected by means of networks. Other forms of servosystems than those diagrammatically shown in Figs. 4 and 5 may also be used, particularly on the machine tool drives where hydraulic or other equivalent systems may have advantages.

The pattern controlled machine tool and method of machining described herein is described and claimed in co-pending application S.N. 561,769, filed January 27, 1956, for "Tool Radius Correction Computer," of which the present application is a division.

Referring to Fig. 3, the positions of yokes 36 and 38 are given in both coarse and fine values by the electrical transmitters or readouts 68 and 74 of fine grade, illustrated as linear position measuring transformers, each movable element thereof being directly coupled to its yoke, the coarser grade of data being provided by the transmitters or readouts 64, 66 and 64', 66' which have their relatively stationary elements fixed to the frame while their relatively rotatable element has driving connections 60, 62 and 60', 62' with its respective yoke. Also, the radial position of pin 22 is given in fine and coarse increments by the electrical transmitter or readout herein shown as linear position measuring transformer 64 which has its relatively movable element directly connected to carriage 20, and by the coarse transmitter or readout 52 which has its fixed element carried by table 16.

I claim:

1. A computer adapted to develop, from data on a variable angle $\theta$ and a radius R, electrical signals representative of the quantities R sin $\theta$ and R cos $\theta$, said computer comprising a frame, a shaft mounted in the frame for rotation in accordance with $\theta$, a crank mounted on the shaft eccentrically thereof by a distance R, two yokes coupled to said crank to move in said frame perpendicularly to said shaft and to each other, two position measuring transformers having each a primary winding member including a multiplicity of uniformly spaced side by side series-connected conductors and a secondary winding member including two windings similar to said primary winding but disposed with respect to each other in space quadrature of the cycle comprising two adjacent primary winding conductors, one member of each of said transformers being positioned on said frame and the other members of said transformers being positioned one on each of said yokes in closely spaced relation to the said one member of the transformer to which it belongs, a slide bearing support on said frame for each of said yokes, a rotary relatively coarse electrical transmitter for each of said yokes, each of said electrical transmitters having relatively rotatable members, one of which is fixed with respect to said frame, and a driving connection between each of said yokes and the other of said relatively rotatable members.

2. A computer adapted to develop, from two pairs of sinusoidally related voltages whose ratios are representative of cyclical increments in an angle and in a linear dimension respectively, two pairs of sinusoidally related voltages whose ratios are representative of cyclical increments in the product of said dimension and the sine of said angle and of cyclical increments in the product of said dimension and the cosine of said angle respectively, said computer comprising a frame, a shaft journaled in the frame, a crank arranged on the shaft for radial motion with respect thereto, a motor coupled between the shaft and crank, two yokes coupled to the crank and mounted in the frame for perpendicular motions perpendicular to the shaft, a linear position measuring transformer coupled between each of said yokes and the frame, and a linear position measuring transformer coupled between said crank and said shaft, a slide bearing support on said frame for each of said yokes, a rotary relatively coarse electrical transmitter for each of said yokes, each of said electrical transmitters having relatively rotatable members, one of which is fixed with respect to said frame, and a driving connection between each of said yokes and the other of said relatively rotatable members.

3. A computer adapted to develop, from data on a variable angle $\theta$ and a radius R, electrical signals representative of the quantities R sin $\theta$ and R cos $\theta$, said computer comprising a frame, a shaft mounted in the frame for rotation in accordance with $\theta$, a crank mounted on the shaft eccentrically thereof by a distance R, two yokes coupled to said crank to move in said frame perpendicularly to said shaft and to each other, two position measuring transformers having each a primary winding member and a secondary winding member, one member of each of said transformers being positioned on said frame and the other members of said transformers being positioned one on each of said yokes in closely spaced relation to the said one member of the transformer to which it belongs, a slide bearing support on said frame for each of said yokes, a rotary relatively coarse eelctrical transmitter for each of said yokes, each of said electrical transmitters having relatively rotatable members, one of which is fixed with respect to said frame, and a driving connection between each of said yokes and the other of said relatively rotatable members.

4. A computer comprising a frame, a shaft journalled in the frame, a crank, means supporting said crank on said shaft for radial motion of said crank with respect to said shaft, a motor for operating said crank, two yokes coupled to said crank and mounted in said frame for perpendicular motions with respect to each other and to said shaft, a linear position measuring transformer coupled between each of said yokes and said frame, a slide bearing support on said frame for each of said yokes, a rotary relatively coarse electrical transmitter for each of said yokes, each of said electrical transmitters having relatively rotatable members, one of which is fixed with respect to said frame, and a driving connection between each of said yokes and the other of said relatively rotatable members, and a linear position measuring transformer coupled between said crank and said shaft.

5. A computer adapted to develop, from data on a variable angle $\theta$ and a radius R, electrical signals representative of the quantities R sin $\theta$ and R cos $\theta$, said computer comprising a frame, a shaft mounted in said frame for rotation in accordance with $\theta$, a crank mounted on said shaft eccentrically thereof by a distance R, two yokes coupled to said crank to move in said frame perpendicularly to said shaft and to each other, fine data electrical transmitters each having a movable element directly connected to one of said yokes, a rack carried by each of said yokes, and relatively coarse data rotary electrical transmitters each having a movable element having a gear connection with one of said racks.

6. A computer comprising a frame, a shaft journalled in said frame, a table on said shaft, a crank pin, means supporting said crank pin on said table for movement of said crank pin to various radial distances from said shaft, a motor carried by said table, a driving connection between said motor and said crank pin, two yokes coupled to said crank pin and mounted on said frame for perpendicular motions with respect to each other and to said shaft, an electrical transmitter of fine grade having a movable element directly connected to said crank pin and having a relatively stationary element carried by said table, and an electrical transmitter of relatively coarse grade having a relatively stationary element carried by said table and having a movable element driven by said motor.

7. A computer comprising a frame, a shaft journaled in said frame, a table on said shaft, a crank pin, means supporting said crank pin on said table for movement of said crank pin to various radial distances from said shaft, a motor carried by said table, a driving connection between said motor and said crank pin, two yokes coupled to said crank pin and mounted on said frame for perpendicular motions with respect to each other and to said shaft, an electrical transmitter of fine grade comprising a linear position measuring transformer having a movable element directly connected to said crank pin and having a relatively stationary element carried by said table, and a rotary electrical transmitter of relatively coarse grade having a relatively stationary element carried by said table and having a movable element having a gear connection with said motor.

References Cited in the file of this patent

UNITED STATES PATENTS

| | | |
|---|---|---|
| 1,718,689 | Grafstrom | June 25, 1929 |
| 2,080,186 | Reymond | May 11, 1937 |
| 2,412,443 | Crooke | Dec. 10, 1946 |
| 2,477,050 | Dyson | July 26, 1949 |
| 2,650,352 | Childs | Aug. 25, 1953 |
| 2,828,456 | Kamm | Mar. 25, 1958 |

OTHER REFERENCES

Analog Method in Computation & Simulation (Soroka), page 31; 1954.